United States Patent [19]
Fahey et al.

[11] 3,877,723
[45] Apr. 15, 1975

[54] BICYCLE TRAILER

[76] Inventors: Robert W. C. Fahey, 18568 Brookhurst, Fountain Valley, Calif. 92708; Kenneth W. McKinzie, 2008 W. Camden, Santa Ana, Calif. 92704

[22] Filed: Oct. 29, 1973

[21] Appl. No.: 406,751

[52] U.S. Cl. ............... 280/204; 280/47.26; 280/492
[51] Int. Cl. ............................................ B60d 1/14
[58] Field of Search .................. 280/204, 47.26, 492

[56] References Cited
UNITED STATES PATENTS

| | | | |
|---|---|---|---|
| 2,468,894 | 5/1949 | Peck | 280/204 |
| 3,347,559 | 10/1967 | Robinson | 280/204 |

FOREIGN PATENTS OR APPLICATIONS

| | | | |
|---|---|---|---|
| 50,089 | 8/1939 | France | 280/204 |
| 1,228,759 | 3/1960 | France | 280/204 |

Primary Examiner—Leo Friaglia
Attorney, Agent, or Firm—Dominick Nardelli

[57] ABSTRACT

A bicycle trailer is disclosed wherein the frame is a lightweight tubular T-shaped fixture supporting a wire basket. The transverse tube houses an axle on which a pair of wheels are mounted. The transverse tube is located aft of the geometrical center of the basket, preferably about 6 inches from the rear of the basket. To adjust the cargo weight bearing on the rear wheel of the bicycle, the stem of the T-shaped fixture, or the longitudinal tubular member, besides being bent into a "Z" to extend upward and forward in front of the basket, has a means whereby the longitudinal member can be extended for heavier loads than for lighter loads. Thus the weight on the rear wheel is kept within acceptable limits regardless of the size and weight of the cargo. To further facilitate ease in pedalling, a universal joint is used to fasten the trailer by the end of the longitudinal member to the bicycle.

5 Claims, 5 Drawing Figures

FIG. 1

PATENTED APR 15 1975 3,877,723
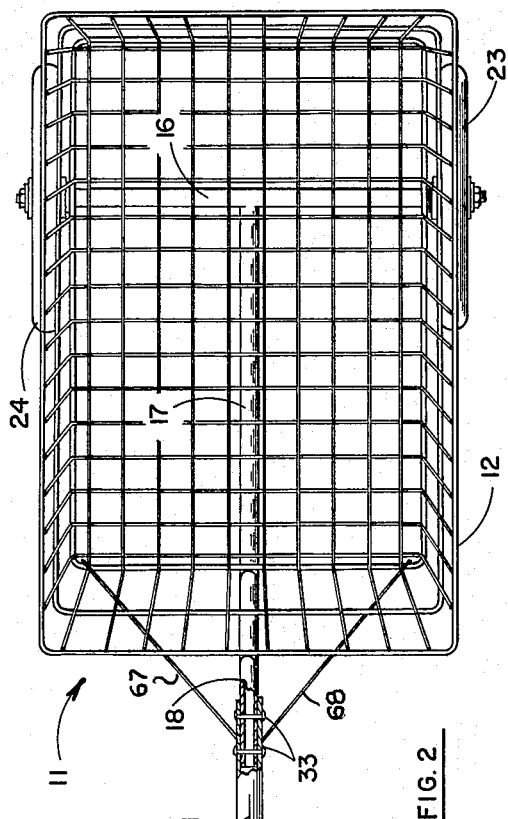
FIG. 2
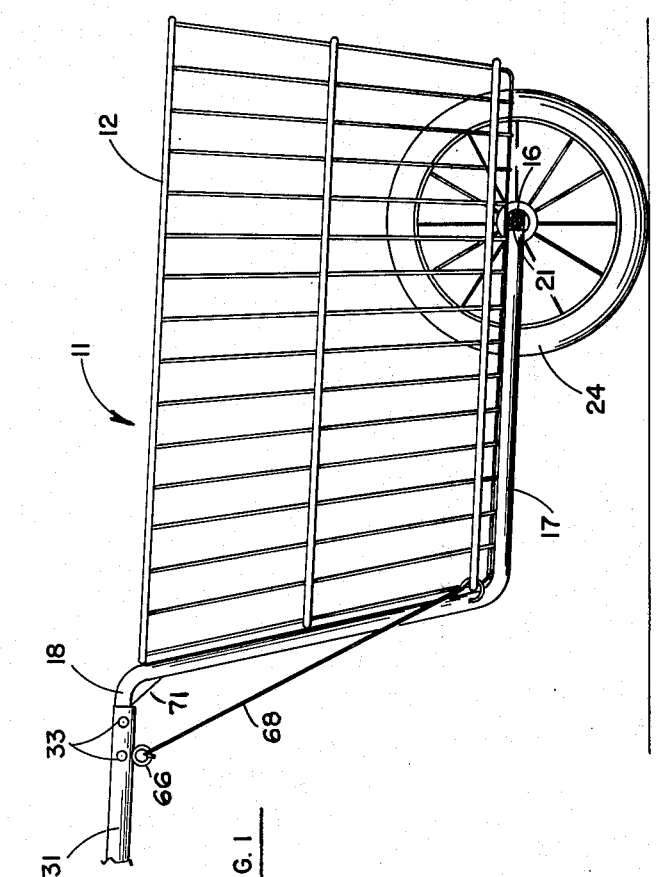
FIG. 1
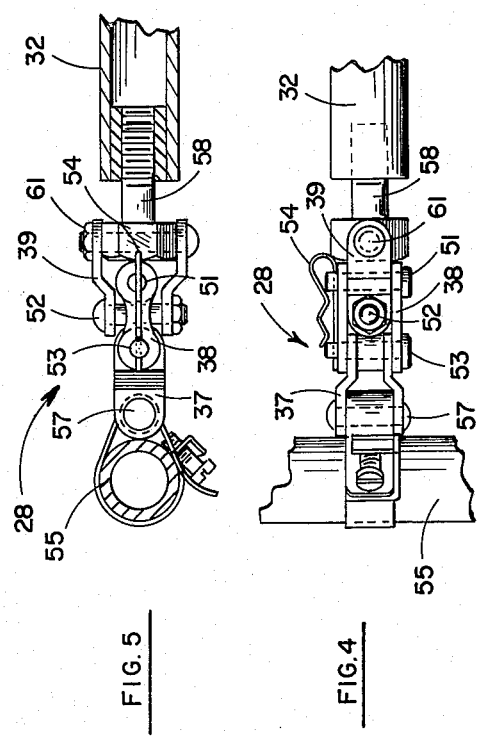
FIG. 5
FIG. 4
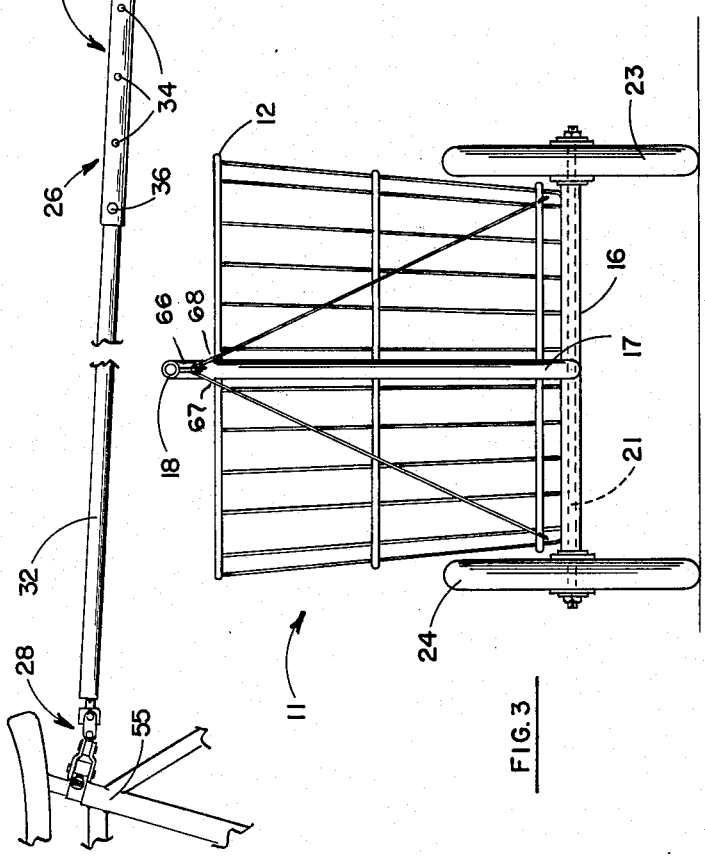
FIG. 3

BICYCLE TRAILER

FIELD OF THE INVENTION

This invention relates to bicycle trailers, and more particularly to a general purpose bicycle trailer that is simple, light in weight, economical and rugged.

BACKGROUND OF THE INVENTION

Up to now, many bicycle trailers have been designed and developed; however, most of them have one common drawback, i.e., they are designed to carry one type of load allowing very little variations for size, shape and density of the load. Bicycles have the inherent characteristics of swinging side to side when being pedalled, especially by a novice. This causes any trailer attached thereto to whip, making for a very dangerous condition, especially in heavy traffic. In addition, one would find that for better control of the bicycle, some of the trailer's weight should be borne by the rear wheel of the bicycle. If this bearing weight is too large, one would find the bicycle difficult to balance and pedal; and if there is not enough, insufficient traction results.

OBJECT OF THE INVENTION

An object of this invention is to provide an economical, efficient, lightweight bicycle trailer having general utility.

Another object of this invention is to provide a coupling means between the bicycle and trailer that minimizes the transfer of the side to side pedalling motion to the trailer.

Another object is to provide a bicycle trailer that has a means for adjusting the bearing load on the rear wheel of the bicycle.

These and other objects and feature of advantage become more apparent to one skilled in the art after studying the following detailed description of the preferred embodiment of the invention, together with the appended drawing.

BRIEF DESCRIPTION OF THE DRAWING

FIG. 1 is an elevation of my novel bicycle trailer, shown attached to a bicycle that is partially shown.

FIG. 2 is a top view of the body portion and some of the frame of the trailer of FIG. 1.

FIG. 3 is a front end view of the trailer of FIG. 1.

FIG. 4 is an enlarged elevation of the coupling means for coupling the trailer to the bicycle.

FIG. 5 is an enlarged top view of the details shown in FIG. 4.

DETAILED DESCRIPTION OF THE DRAWING

Referring to FIGS. 1, 2, and 3 in particular, three views of the novel bike trailer are shown. The trailer has a body 11 in the form of a wire basket, with sloping sides to allow one basket to nest into another. The basket is, for example, 18 inches wide, 18 inches high, and 24 inches long, and has a circumferential oblong ring 12 around its top. Depending from the ring 12 are rods or wires that extend down from one side of the oblong ring, then extend horizontally to form the bottom of the basket, and then up the opposite side in a standard manner. For reasons that will become apparent hereinafter, the forward side of the basket has a greater slope than the rear side. The basket body 11 is supported by a T-shaped frame which includes a cross-arm or transversal tube 16, welded to the underside of the basket, transverse thereto, and a stem or longitudinal tube 17 that is welded to the cross-arm tube 16 at one end and extends forward and up the front side of the basket. The other end of the tube 17 is bent substantially horizontal to form a short stem 18. As the cross-arm tube 16 is welded to the underside of the horizontal portions of the longitudinal wires, the stem tube 17 is welded to the respective horizontal portions of the transverse wires, making contact therewith. The stem tube 17 is also welded to ring 12. The cross-arm tube 16 houses on axle 21 which is threaded therethrough and has standard wheels 23 and 24 bearing mounted on each end. In FIG. 1, only wheel 24 is shown, which is on the left side, to show that tube 16 has preferably a square cross-section. This allows for more weld length between the tube 16 and the respective wires for greater strength. Also as shown in FIG. 1, the tube 16 is positioned aft of the geometrical center of the basket and in the embodiment described, the axle is approximately 6 inches from the rear of the basket.

The trailer body 11 is connected to the bicycle by the aid of a towbar means 26, having a means 27 for adjusting the length and a universal coupler 28, more clearly shown in FIGS. 4 and 5. The means 27 for adjusting length has a first tube 31 into which telescopes a small diameter tube 32. Stem 18 slips into the respective end of tube 31 and is suitably bolted by a couple of bolt and nut means 33. To allow the towbar means 26 to be elongated or shortened, tube 31 is provided with a plurality of pairs of axially spaced diametrically opposed holes 34, and tube 32 with a pair of diametrically opposed holes, not shown, near its end. A nut and bolt means 36, which passes through one pair of the holes 34 and the pair of holes in tube 32 secures the two tubes together. One can see by using any one of the other pair of holes 34, the towbar means would be made shorter.

The universal coupler 28 is made economically and simply by employing three standard bicycle-type chain roller links 37, 38, and 39 of various standard shapes. As one skilled in the art knows, a standard chain roller link has two spaced longitudinal arms with holes formed near their respective ends, and a pin passing through the holes in one link, and engaging the holes of the adjacent link arms. To maintain the arms apart, a roller is disposed between the arms. Links 37 and 38 are coupled together in a standard manner while links 38 and 39 are linked as shown. Link 38 has one of its transverse pins 51 passing through the center space of link 39 and, in turn, link 39 has one of its pins 52 passing through the center space of link 38. Therefore, while links 37 and 38 allow pivoting about a vertical axis defined by a pin 53, the links 38 and 39 allow pivoting about a horizontal axis defined by pin 52. A cotter pin 54 allows one to quickly disconnect the trailer from the bicycle frame 58. A standard hose clamp 56, disposed around the frame 55, and a pin 57 on link 37 secures the coupler 28 to the bicycle. The coupler 28 is also secured to the tube 32 with the aid of a hex-headed bolt 58 threaded into a bushing which is internally welded in the end of tube 32, as shown. A pin 61 on link 39 passes through a suitably disposed transverse hole in the head of bolt 58.

To provide transverse rigidity within stem 18 on the end of tube 17, an eye means 66 is welded to the underside and near its end. The eye means 66 slips through a suitable slot (not shown) in tube 31. Now from eye means 66 a pair of diagonal rods or wires 67 and 68 are fastened between the means 66 to the respective lower front corners of the body in a convenient manner. Vertical rigidity within the stem 18 is provided by a bracket 71 suitably welded within the bend as shown in FIG. 1.

In operation, one places the cargo within the basket 11 or on top of it, if it is too big to fit inside, i.e., if the cargo happens to be, for example, building lumber. With the coupler 28 disconnected, as the cotter pin 54 has been removed, one lifts by hand on the end of tube 32 to determine the degree of force required to accomplish the lift. If the force is too large, you remove bolt and nut means 36 and make the towbar means 26 longer until the lifting force is about five pounds. If the lifting force is less than five pounds, he makes the towbar means 26 shorter until the lifting force is also about 5 pounds. The link 38 and cotter pin 54 are reassembled and one simply pedals the bike away. One can see that the universal coupler 28 allows for any up and down motion between the bicycle and trailer body 11, and also for the lateral motion between the two.

Having described the preferred embodiment of my invention, a person skilled in the art, after studying the above disclosures, could devise other embodiments without departing from the scope and spirit of our invention. Therefore, the invention is not limited to the described embodiment, but is limited to all embodiments included within the scope of the appended claims.

We claim:

1. A bicycle trailer adapted to be towed behind a bicycle comprising;
   a body, a frame, and a pair of wheels disposed under said body, to allow said body to be rolled along the ground;
   said pair of wheels being mounted on opposite sides of said body and aft of the geometrical center thereof;
   said frame including towbar means extending forward from the front end of said body, and a coupler for fixing said towbar means to said bicycle;
   a first tube fixed transversely to the underside of said body;
   a second tube fixed to said first tube and fixed to the underside of the body so that said second tube extends forward of said body;
   said second tube is further disposed to be fixed to the front of said body and terminating near the top thereof;
   said towbar means being coupled to said second tube;
   said first tube being square in cross-section, with a flat side thereof adjacent and fixed to the underside of said body.

2. A bicycle trailer adapted to be towed behind a bicycle comprising:
   a body, a frame, and a pair of wheels disposed under said body, to allow said body to be rolled along the ground;
   said pair of wheels being mounted on opposite sides of said body and aft of the geometrical center thereof;
   said frame including towbar means extending forward from the front end of said body, and a coupler for fixing said towbar means to said bicycle;
   said coupler being a universal coupler; and
   includes at least three roller chain links wherein:
   one pin of a first one of said links is disposed within the opening of the second one of said links, which is disposed adjacent thereto; and
   one pin of said second link disposed within the opening of said first link.

3. The trailer of claim 2 wherein said frame further includes:
   a first tube fixed transversely to the underside of said body; and
   a second tube fixed to said first tube and disposed longitudinally and fixed to the underside of said body so that said second tube extends forward of said body;
   said second tube being further disposed to be fixed to the front of said body and terminating near the top thereof, and said towbar means is coupled to said second tube.

4. The trailer of claim 3 wherein said towbar means includes:
   a third tube and a fourth tube, telescoping within said third tube; and
   means for fixing the position of said tubes relative to each other so that the total length thereof is adjustable.

5. The trailer of claim 4 wherein said first tube is square in cross-section with the flat side thereof adjacent and fixed to the underside of said body, and said body is a wire basket having an oblong shaped top opening and sloping walls.

* * * * *